Feb. 6, 1934.  E. J. W. RAGSDALE ET AL  1,946,445
SEAM WELDER
Filed May 5, 1932
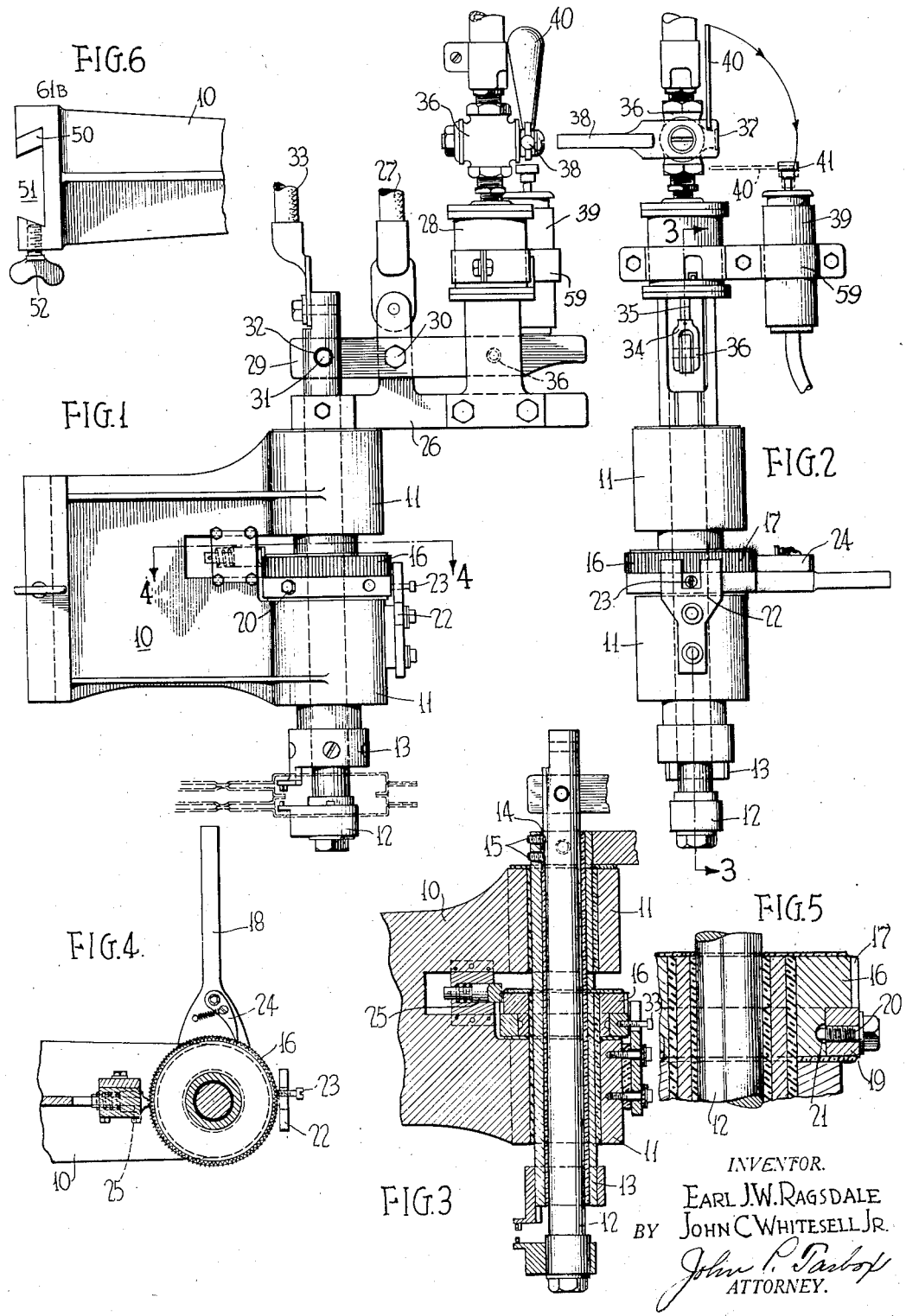
INVENTOR.
EARL J.W. RAGSDALE
JOHN C WHITESELL JR.
BY
John P. Taylor
ATTORNEY.

Patented Feb. 6, 1934

1,946,445

UNITED STATES PATENT OFFICE 1,946,445

SEAM WELDER

Earl J. W. Ragsdale and John C. Whitesell, Jr., Norristown, Pa., assignors to Edward G. Budd Manufacturing Company, Philadelphia, Pa., a corporation of Pennsylvania Application May 5, 1932. Serial No. 609,417

7 Claims. (Cl. 219—4)

Our invention relates to welding and more particularly to machines capable of welding internal seams and has for its principal object the construction of such a machine which allows visible external control of the welding electrodes during internal welding operations.

Other objects of our invention relate to the simple manner in which the electrodes may be positioned interiorly of the work and withdrawn therefrom after the welding operation has been performed.

We attain the above desired objects and others incidental thereto by means of an internal seam welding machine including concentrically mounted welding electrodes adapted for joint rotary motion and capable of relative reciprocable movement.

Our invention will be better understood from the following description when considered in connection with the accompanying drawing wherein like ordinals represent corresponding parts in the various figures.

In the accompanying drawing,

Fig. 1 is a side elevation of a machine constructed in accordance with this invention.

Fig. 2 is an end view.

Fig. 3 is a cross section on the line 3—3 of Fig. 2.

Fig. 4 is a partial section on the lines 4—4 of Fig. 1.

Fig. 5 is an enlarged section taken centrally of the electrodes.

Fig. 6 is a partial plan view showing means for obtaining relative adjustment of the electrode carrying mechanism.

In accordance with this invention I have provided an adjustable electrode carrying arm 10 comprising two vertically spaced bearings 11. Housed within the bearings and insulated therefrom are the concentric electrode members 12 and 13 adapted for joint rotary motion. The joint rotary motion of the electrodes is obtained by means of the co-operation between the keyway 14 in the electrode 12 and the adjustable members 15 mounted in and insulated from the electrode 13. This construction allows the electrodes to move axially, relatively to each other, while at the same time being limited with respect to rotary motion so as to always position the electrodes in aligned welding relation. Mounted firmly in insulated relation to the electrode 13 is a collar 16 bearing a peripheral ratchet surface 17 comprising a plurality of spaced teeth.

To obtain predeterminate rotary motion of the electrodes there is used a hand operated means associated with the collar 16. This means comprises a member having an integral ring shaped yoke 19 and an elongated arm 18, the ring portion being positioned concentrically of the collar 16 and freely rotatable thereupon. The ring shaped portion has a plurality of key members 20 adapted to ride in an annular groove 21 in the collar 16. The co-operation obtained between the mechanism 18 and the collar 16 is desirable because of the necessary vertical movement of the electrodes. The member 18 although adapted for free and unrestricted rotary motion as regards the collar, is limited to a predeterminate rotary movement by means of a limit stop 22 in the form of a yoke. A pin 23 secured to the ring 19 projects within the opening of the yoke and limits the movement with respect thereto. Mounted upon the lever 18 and adapted for co-operation with the ratchet 17 is the pawl member 24. The limit stop is adapted to allow the pawl, movement over a predetermined number of ratchet teeth, thereby always moving the electrode a definite spaced amount with respect to the work. To prevent retrograde movement of the electrodes during the motion of the member 18 a yieldable one way clutch 25 is provided. The clutch allows the member 18 to be moved relative to the collar 16, but relative movement of the collar is prevented. The member 25 engages the upper portion of the ratchet teeth 17 as shown in the drawing but a sufficient space is allowed between the two bearings 11 so that simultaneous vertical movement of the electrodes may be obtained without affecting the operation of the limit stops and clutch.

The operation of the parts of the machine so far described, is quite simple in that the electrodes are freely rotatable within the bearings 11 and by means of the lever arm 18, may be moved by a step by step motion. The electrodes after being positioned interiorly of the work parts, weld at definite spaced apart, concentric locations giving a strong joint. If the joint should of necessity be gas tight the simple expedient of making an additional concentric seam by means of another set of electrodes having slightly different radii may be used. Another way in which the seams may be made is to make one seam by a chisel weld in which case the seam will be continuous.

Regarding the relative reciprocable motion of the electrodes the mechanism now to be described provides the necessary motion. Secured to the upper extremity of the electrode member 13 is a horizontal arm 26, serving several functions; one being to limit the downward movement of the electrode with respect to the bearing, another is being the electrode connection to the power terminal 27, and still a further one is acting as a support for the pneumatic mechanism which gives the reciprocating motion. The pneumatic mechanism comprises a simple pneumatic cylinder 28 fastened in secured relation to the arm 26. Connecting the pneumatic cylinder and the central electrode 12 is a system of levers. This system includes a horizontal lever 29 fulcrumed to the arm 26 at the point 30. The left hand extremity of this arm is pivoted to the electrode 12, at 31, and insulated therefrom by means of a sleeve 32 and other insulating washers not visible in the figure. Connected to this electrode is the other member of the power supply 33. At the right hand extremity of the arm 29 is pivoted at 36 a yoke 34 secured to the connecting rod 35 which is secured to the piston interiorly of the cylinder. Control of this mechanism is obtained by the valve 36 having a port 37 opening to the atmosphere and a lever 38 for controlling the valve.

After the electrodes have been positioned interiorly of the work the valve 36 is operated by means of the lever arm 38 admitting air to the cylinder and thereby raising the electrode 12 with respect to electrode 13. It is readily obvious that considerable pressure may be obtained in this manner and also that an equalizing of the electrodes with regard to the work occurs. If the electrode 13 does not abut against the work when the pressure is applied to the electrode 12 a relative movement between the two electrodes will cause them to be drawn together. In this manner any inequalities or uneven places in the work parts may be compensated for very readily.

To obtain automatic control of the electric circuit including the electrodes we have associated with the pneumatic mechanism an electrical switch 39 carried on a bracket member 59. This switch is operated by means of an arm 40 secured to the valve operating arm 38. During the operation of the valve the arm 40 describes an arc substantially as indicated. The electrodes are initially closed upon the work and then as the valve continues to open to pressure, the electrodes are forced more firmly together until at a predetermined condition of pressure, the arm 40 contacts with the operating member 41 and the electric switch 39 thereby closes the power circuit supplying current to the electrodes.

In Figure 6 a removable gib 50 is mounted in the keyway 51 whereby considerable lost motion may be obtained between these parts. By removing the gib and allowing the electrode supporting mechanism to be pivoted with regard to its keyway, the electrodes may be moved on an axis different from their normal operating axis. In this manner they may be positioned interiorly of small openings wherein the clearance is necessarily limited. On the opposite side of the keyway is mounted suitable fastening or locking means shown as a simple wing headed bolt. It is obvious that any suitable mechanism may be used for this purpose.

Because of the relative concentric condition of the electrodes suitable insulation is necessary at all parts of the machine. Concentric insulating cylinders are mounted between the electrodes and between the electrode and bearing, and insulated washers are mounted between the various parts of the machine which contact with portions either in the opposite electrode circuit or grounded with the machine body.

Our invention is susceptible of many modifications and the form shown is merely for the purpose of explanation, we aim to cover by the appended claims all modifications within the true spirit and scope of our invention.

What we claim is:

1. In an internal seam welding machine the combination of concentrically mounted welding electrodes adapted for joint rotary motion and relative reciprocable movement.

2. In a welding machine the combination of jointly rotatable, concentrically mounted electrodes adapted for relative reciprocatory movement and means adapted to impart predeterminate rotary movement to said electrodes.

3. In a welding machine the combination of relatively reciprocable concentrically mounted electrodes adapted for joint rotary motion and means adapted to impart predeterminate relative reciprocatory motion to said electrodes.

4. In a welding machine the combination of concentrically mounted welding electrodes adapted for joint rotary motion and relative axial motion, means adapted to impart predeterminate axial motion to said electrodes, a welding circuit including said electrodes, and means co-ordinated with said last named means and adapted to control said welding circuit.

5. In a welding machine the combination of concentric welding electrodes adapted for joint rotary motion and relative axial movement and means including a ratchet and pawl adapted to impart predeterminate step by step rotary motion to said electrodes.

6. In a welding machine the combination of concentric welding electrodes adapted for joint rotary motion and relative axial movement and means including a pneumatic motor adapted to impart relative reciprocatory movement to said electrodes.

7. In a seam welding machine the combination of concentric welding electrodes adapted for joint rotary and relative axial reciprocatory movement, means including a ratchet and pawl adapted to impart predeterminate step by step rotary motion thereto, means including a pneumatic motor adapted to impart relative reciprocatory axial movement thereto, an electric circuit including said electrodes, hand operated means to control said pneumatic motor and means associated therewith adapted to control said electric circuit.

EARL J. W. RAGSDALE.
JOHN C. WHITESELL, Jr.